United States Patent [19]

Basola et al.

[11] 4,385,800

[45] May 31, 1983

[54] CONNECTOR FOR COUPLING AN OPTICAL FIBER TO A LIGHT SOURCE, AND METHOD OF ASSEMBLING SAME

[75] Inventors: Carlo P. Basola; Guido Chiaretti, both of Milan, Italy

[73] Assignee: Cselt - Centro Studi e Laboratori Telecomunicazioni S.p.A., Turin, Italy

[21] Appl. No.: 217,389

[22] Filed: Dec. 17, 1980

[30] Foreign Application Priority Data

Dec. 21, 1979 [IT] Italy .................. 69449 A/79

[51] Int. Cl.³ ............................................. G02B 7/26
[52] U.S. Cl. .................................. 350/96.20; 350/320
[58] Field of Search ............... 350/96.17, 96.18, 96.20, 350/320, 96.21; 250/227; 357/17, 19

[56] References Cited

U.S. PATENT DOCUMENTS

| 4,075,477 | 2/1978 | Hanson | 250/227 |
|---|---|---|---|
| 4,166,668 | 9/1979 | MacLeod | 350/96.20 |
| 4,179,801 | 12/1979 | Hollis | 350/96.20 X |
| 4,184,741 | 1/1980 | Hawk et al. | 350/96.20 |
| 4,281,891 | 8/1981 | Shinohara et al. | 350/96.18 |
| 4,307,934 | 12/1981 | Palmer | 350/96.2 |

FOREIGN PATENT DOCUMENTS

| 54-0104355 | 8/1979 | Japan | 350/96.20 |
|---|---|---|---|
| 55-0022711 | 2/1980 | Japan | 350/96.21 |
| 55-95919 | 7/1980 | Japan | 350/96.20 |

OTHER PUBLICATIONS

Dakss, "Coupling Light Sources to Fibers," *Laser Focus*, Dec. 1975, pp. 31-34.
CSELT Rapporti Tecnici, vol. VI, No. 4, Dec. 1978, pp. 279-285, Basola et al., "Design Criteria for Optimum Coupling Between . . .".

*Primary Examiner*—John D. Lee
*Attorney, Agent, or Firm*—Karl F. Ross

[57] ABSTRACT

In order to couple an input end of an optical fiber to a light source designed to illuminate same with message signals, the light source—such as an LED—is mounted on a dielectric disk where it is surrounded by a flat ring confronting another ring with a stepped inner profile from which a cylindrical sleeve projects on the side opposite that disk. A capillary tube, closely fitting into the axial bore of the sleeve, is fitted around an extremity of the fiber stripped of its protective sheath so as to extend close to the source when the two rings are substantially coaxially juxtaposed; with the source energized, the light emitted at the opposite fiber end is measured to determine the correct alignment position in which the two rings are cemented to each other. The illuminated fiber end, rounded into spherical shape to act as a focusing lens, is then moved into the proper distance from the source by an axial shifting of the capillary tube in the sleeve whereupon the tube is cemented to the sleeve; the joints so formed are thereafter enshrouded in a protective cap.

12 Claims, 2 Drawing Figures

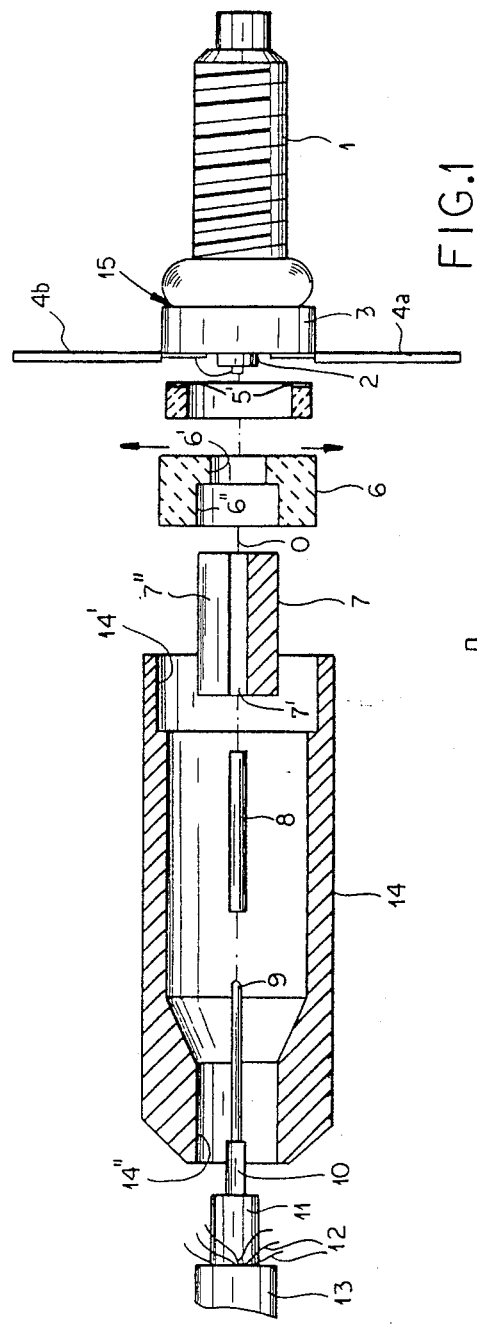
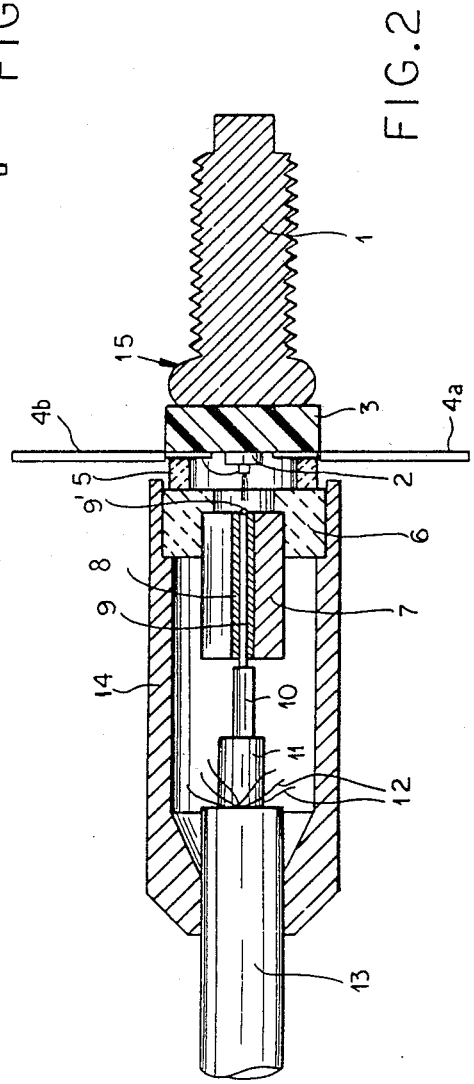
FIG.1
FIG.2

CONNECTOR FOR COUPLING AN OPTICAL FIBER TO A LIGHT SOURCE, AND METHOD OF ASSEMBLING SAME

FIELD OF THE INVENTION

Our present invention relates to a method of and a device for coupling an optical fiber, forming part of a telecommunication system, to a light source designed to transmit message signals through that fiber by intermittently illuminating an input end thereof.

BACKGROUND OF THE INVENTION

The efficiency of an optical fiber as a signal transmitter depends to a large extent on a precise alignment of its input end with an associated light source to maximize the transfer of luminous energy therebetween. Thus, the maximum-radiance axis of the source—usually a light-emitting diode—must coincide as closely as possible with the axis of the illuminated fiber extremity; when that extremity ends in a spherically convex tip acting as a converging lens, its distance from the source is also critical since its focus should lie at a point of high luminous intensity, generally the center of the source.

If, for example, a light source with near-field emission configuration of 50% at a distance of $23\mu$ and 10% at $42\mu$ is to be coupled with an optical fiber whose core has a stepped refractive-index profile and a diameter of $80\mu$, and if the input end of the fiber has a spherical curvature with a radius of $57\mu$ and with a numerical aperture of 0.162, a loss of 3 dB corresponds to a lateral offset of $15\mu$ and to a distance variation of $50\mu$ from an optimum position.

OBJECTS OF THE INVENTION

Thus, an important object of our present invention is to provide a device for facilitating the coupling of a fiber extremity to its light source with a high degree of precision, preferably within tolerances not exceeding $1\mu$, to ensure a maximum transfer of luminous energy from the source to the fiber.

A more particular object is to provide a connector for the purpose set forth which enables a final adjustment of the relative position of the source and the fiber extremity on the basis of actual transmission tests performed with a provisional setting.

A related object is to provide a method of assembling such a connector in a manner designed to take the result of these tests into consideration.

SUMMARY OF THE INVENTION

A connector according to our invention comprises a support carrying the light source spacedly surrounded by a flat first ring to which a second ring is substantially coaxially bonded, the latter ring being provided with a tubular extension remote from the first ring whose axial bore has a diameter smaller than the inner diameters of both rings. A capillary tube bonded to that extension, and fitted into its axial bore, embraces the fiber extremity to be illuminated by the source and is bonded to that extremity so as to hold its tip closely spaced from the light source; a protective sheath enveloping the fiber is partly stripped away to terminate ahead of the capillary tube; in its stead, a protective cap surrounds the tubular extension and an adjoining portion of the fiber.

Advantageously, pursuant to a more particular feature of our invention, the tubular extension is a cylindrical sleeve originally separated from the second ring but bonded thereto after receiving the fiber extremity. This enables the tip of the fiber extremity, projecting slightly from an end of that sleeve, to be subjected to a shaping operation providing it with a spherically convex curvature; such shaping may be accomplished, in a manner well known per se, by heating the fiber to a temperature near its melting point for a short period. The second ring preferably had a stepped internal profile with a smaller-diameter section confronting the first ring and a larger-diameter section partly surrounding the sleeve to ensure a precise coaxial positioning thereof. The sleeve and the second ring, whether or not they are initially separated, may thus be regarded as a holder for the fiber extremity; the external shape of that holder is not critical, except that it should conveniently fit into the protective cap after proper alignment with the light source.

Such alignment, pursuant to another aspect of our invention, involves the step of closely juxtaposing the holder (after insertion of the capillary tube into its bore) with the first ring in a substantially coaxial position; with the tip of the fiber extremity confronting the light source, the latter is energized and the emission of light at the opposite fiber end is observed while this ring and the holder are relatively shifted transversely to the fiber extremity until the emission is of substantially maximum intensity, indicating a proper alignment of the source with the fiber. In the relative position thus attained, the two members are bonded to each other in order to maintain the alignment. If the fiber tip is spherically curved, the emission of light at the remote end is further observed while its illuminated extremity is axially shifted in the bore of the holder until the emitted energy peaks again; that axial position is then frozen by immobilizing the fiber extremity relative to the capillary tube.

The described alignment steps can be performed before the application of a bonding agent (e.g. a synthetic resin) or after such application but before the hardening thereof.

BRIEF DESCRIPTION OF THE DRAWING

The above and other features of our invention will now be described in detail with reference to the accompanying drawing in which:

FIG. 1 is an exploded sectional view of a connector embodying our invention, showing its components before assembly thereof; and FIG. 2 is a sectional view of the assembled connector.

SPECIFIC DESCRIPTION

A support, generally designated 15, comprises a threaded stem 1 rigid with a dielectric disk 3 serving as a carrier for a high-radiance light-emitting diode 2 such as, for example, a front-emitting Burrus LED. Diode 2 is connected to a nonillustrated supply of operating current via a pair of leads 4a, 4b lying flat against the face of disk 3. Stem 1 can be screwed into a suitable mounting not shown.

A flat ring 5 of insulating material with a low thermal coefficient of expansion, such as alumina ($Al_2O_3$), has an inner diameter greater than the diameter of diode 2 and is cemented onto disk 3 with the aid of a suitable adhesive, preferably a synthetic resin also having a low expansion coefficient. Ring 5 is shown provided with two narrow radial grooves 5' accommodating the diode leads 4a and 4b; its axial thickness is substantially smaller than its inner diameter.

Another ring 6, preferably of the same ceramic material as ring 5, has a stepped internal profile forming a smaller-diameter section 6' confronting the ring 5 and a larger-diameter section 6" adapted to receive a cylindrical sleeve 7 of a dimensionally stable alloy such as one known under the registered trademark "kovar". The inner diameter of section 6' is less than that of ring 5 but greater than the diode diameter; the axial thickness of each section approximately equals that of ring 5.

Sleeve 7 has an axial bore 7', which, in the embodiment illustrated, is radially extended to the outer periphery of the sleeve by a longitudinal slot 7"; that slot, preferably narrower than the bore, facilitates the introduction of an adhesive—advantageously of the aforedescribed resinous type—into the sleeve to cement same to a capillary tube 8 which closely fits into the bore 7' and is of approximately the same length. Tube 8, preferably made of steel, has an inner diameter slightly exceeding the outer diameter of an optical fiber 9 whose extremity can thus be inserted into that tube with its tip 9' slightly projecting therefrom as shown in FIG. 2. Prior to that insertion, a fiber extremity of suitable length is stripped of its protective sheath shown to consist of an inner layer 10, an intermediate layer 11, a filamentary layer 12 and an outer layer 13. Inner layer 10 is of substantially the same outer diameter as capillary tube 8 and adjoins same in the assembled state; cementing that layer to tube 8 fixes the position of the fiber in this tube. A protective cap 14, e.g. of aluminum, is then placed around the assembly so that a front end 14' thereof closely embraces the ring 6 and also extends partly around ring 5 while a bore 14" at its rear end receives the sheathing 13.

After the fiber extremity has been inserted into tube 8 and bonded thereto, its projecting tip 9' is spherically rounded (as by the aforedescribed heating process) whereupon the tube is introduced into the bore 7' of sleeve 7 which is then fitted into section 6" of ring 6 and cemented thereto. With support 15 fixedly mounted, and with ring 5 bonded onto disk 3 to hold the LED 2 in place, the two rings 5, 6 are placed in face-to-face contact with ring 6 substantially centered on the maximum-radiance axis 0 of LED 2. The LED is now energized to illuminate the fiber tip 9' and the light emitted at the remote end of fiber 9 is observed, visually or by photosensing equipment, while the two rings are relatively shifted transversely to the axis as indicated by vertical arrows in FIG. 1. When the light output reaches a maximum, the rings are relatively immobilized by cementing (or by the hardening of an adhesive previously applied), again preferably with use of a resinous bonding agent of low expansion coefficient.

At this stage, tube 8 is held only frictionally in the bore 7' of sleeve 7 and can therefore be axially displaced therein. When the monitoring of the light output at the remote fiber end reveals a peak emission during such displacement, tube 8 is cemented to sleeve 7 (or the adhesive already introduced into slot 7" is allowed to harden) to complete the connection. The protective cap 14, previously slid over sheathing 13, is then moved forward to embrace the ring 6 with close fit and to be cemented thereto while overhanging the joint between the two rings.

With this mode of assembly it is no longer necessary to shape the fiber tip 9' to a precisely predetermined radius of curvature since the subsequent axial adjustment of tube 8 in sleeve 7 ensures proper focusing on the basis of the actual structural parameters.

Reference may be made to an article entitled "Design Criteria For Optium Coupling Between a High-Radiance LED and a Bulb-Ended Fiber", published by our assignee in CSELT RAPPORTI TECNICI Volume VI, No. 4 dated December 1978, in which we have described the results of a study carried out with bulb-ended (i.e. convex-faced) optical fibers having different radii of curvature in a range of 45 to 100μ.

We claim:

1. A connector for coupling an optical fiber to a light source, comprising:
    a support carrying a light source spacedly surrounded by a flat first ring;
    a second ring bonded substantially coaxially to said first ring, said second ring being provided with a tubular extension remote from said first ring having an axial bore of a diameter smaller than the inner diameters of said rings;
    a capillary tube fitted into said axial bore and bonded to said extension, said tube embracing an extremity of an optical fiber bonded thereto with a tip closely spaced from said light source, said fiber being provided with a protective sheath terminating ahead of said tube; and
    a cap spacedly surrounding said extension and an adjoining portion of said fiber.

2. A connector as defined in claim 1 wherein said extension is a cylindrical sleeve bonded onto said second ring.

3. A connector as defined in claim 2 wherein said second ring has a stepped internal profile with a smaller-diameter section confronting said first ring and a larger-diameter section partly surrounding said sleeve, the inner diameter of said first ring exceeding that of said smaller-diameter section.

4. A connector as defined in claim 2 or 3 wherein said sleeve has a longitudinal slot extending radially from said bore to the outer sleeve periphery.

5. A connector as defined in claim 1, 2 or 3 wherein said cap embraces said second ring and part of said first ring.

6. A connector as defined in claim 1, 2 or 3 wherein said source is a light-emitting diode, said support comprising a dielectric disk carrying said diode and said first ring along with leads extending from said diode to a supply of operating current therefor.

7. A connector as defined in claim 6 wherein said support further comprises a threaded stem rigid with said disk on a side thereof opposite said diode.

8. A connector as defined in claim 1, 2 or 3 wherein said tip is spherically convex and forms a converging lens with a focal point at said light source.

9. A method of coupling an optical fiber to a light source designed to illuminate an input end thereof with message signals, comprising the steps of:
    (a) mounting said light source on a flat face of a support;
    (b) attaching to said flat face a ring concentrically surrounding said light source;
    (c) stripping an extremity of said optical fiber of a protective sheath enveloping same and introducing the stripped extremity into a capillary tube with a tip of said extremity slightly projecting from an end of said tube;
    (d) bonding said extermity to said tube;
    (e) inserting said tube with said extremity into an axial bore of a holder therefor, said bore having a length substantially equaling that of said tube;

(f) closely juxtaposing said holder with said ring to confront said tip with said light source;

(g) with said light source energized, observing the emission of light at the opposite end of said fiber while relatively shifting said holder and said ring transversely to said extremity until said emission is of substantially maximum intensity; and (h) thereupon immobilizing said holder relative to said ring.

10. The method defined in claim 9 wherein said tip is given a spherically convex curvature to form a converging lens, comprising the further steps of:

(i) with said light source energized, axially shifting said extremity in said bore while observing the emission of light at said opposite end until said emission is of substantially maximum intensity; and (j) thereupon immoblizing said extremity in said holder.

11. The method defined in claim 10 wherein said spherically convex curvature is imparted to said tip between steps (d) and (e).

12. The method defined in claim 9, 10 or 11 wherein step (f) includes inserting said holder into an internally stepped second ring, bonding said holder to said second ring and placing said second ring in face-to-face contact with the first-mentioned ring in substantially coaxial relationship therewith.

* * * * *